Patented Apr. 5, 1932

1,852,959

UNITED STATES PATENT OFFICE

PAUL DUTOIT, OF LAUSANNE, SWITZERLAND

PROCESS FOR THE PREPARATION OF PENTASULPHIDE OF PHOSPHORUS

No Drawing. Application filed December 1, 1928, Serial No. 323,212, and in Switzerland December 1, 1927.

The present invention relates to a process for the manufacture of pentasulphide of phosphorus, according to which sulphur vapour is caused to act on ferro-phosphorus at a temperature below that of fusion.

This process can be carried out for instance as follows:

Pulverized ferro-phosphorus is mixed with a pulverized sulphide infusible at the proposed temperature of reaction, and the mixture is heated to the said temperature. The vapours of phosphorus and sulphur combine together in a continuous manner, so that the mixture constantly emits the original vapours. The product formed is condensed by a suitable refrigeration at the point of discharge from the apparatus in which the reaction takes place.

If for instance ferro-phosphorus, containing 21% by weight of phosphorus and pyrites are used, the reactions taking place can be written as follows:

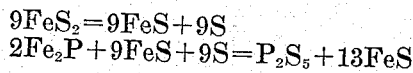

$$9FeS_2 = 9FeS + 9S$$
$$2Fe_2P + 9FeS + 9S = P_2S_5 + 13FeS$$

for it is in the said proportions that the yield is at a maximum.

The reaction normally takes place between 700° and 800° C.

By way of example, good results are obtained with the following proportions: 80 kgs. of $FeS_2$ are mixed with 15 kgs. of ferro-phosphorus containing about 21% by weight of phosphorus; the mixture is heated to 750° C. and, after condensation, 11 kgs. of pentasulphide of phosphorus are recovered. The above equations show that the relative proportions by weight of the pyrites, ferro-phosphorus and phosphorus pentasulphide are as follows:

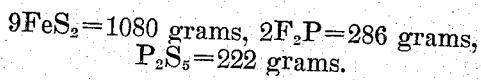

$$9FeS_2 = 1080 \text{ grams}, \quad 2F_2P = 286 \text{ grams},$$
$$P_2S_5 = 222 \text{ grams}.$$

Consequently, for obtaining 11 kgs. of pentasulphide, theoretically only 55 kgs. of pyrites would have been necessary.

But an excess of $FeS_2$ is required in order to prevent any formation of phosphorus trisulphide.

All the reactions take place in the absence of air.

What I claim is:

1. In the process for the preparation of pentasulphide of phosphorus, the steps consisting of reacting sulfur vapors on ferro-phosphorus at a temperature comprised between 700° C. and 800° C. and condensing the pentasulphide of phosphorus generated.

2. In the process for the preparation of pentasulphide of phosphorus, the steps consisting of mixing pyrites with ferro-phosphorus, heating the mixture to a temperature comprised between 700° C. and 800° C. and condensing the pentasulphide of phosphorus generated.

In testimony whereof, I hereunto affix my signature.

PAUL DUTOIT.